June 27, 1961 F. S. FLICK 2,989,949
PISTON SPEED CONTROL VALVES FOR PISTON AND CYLINDER DEVICES
Filed June 3, 1958
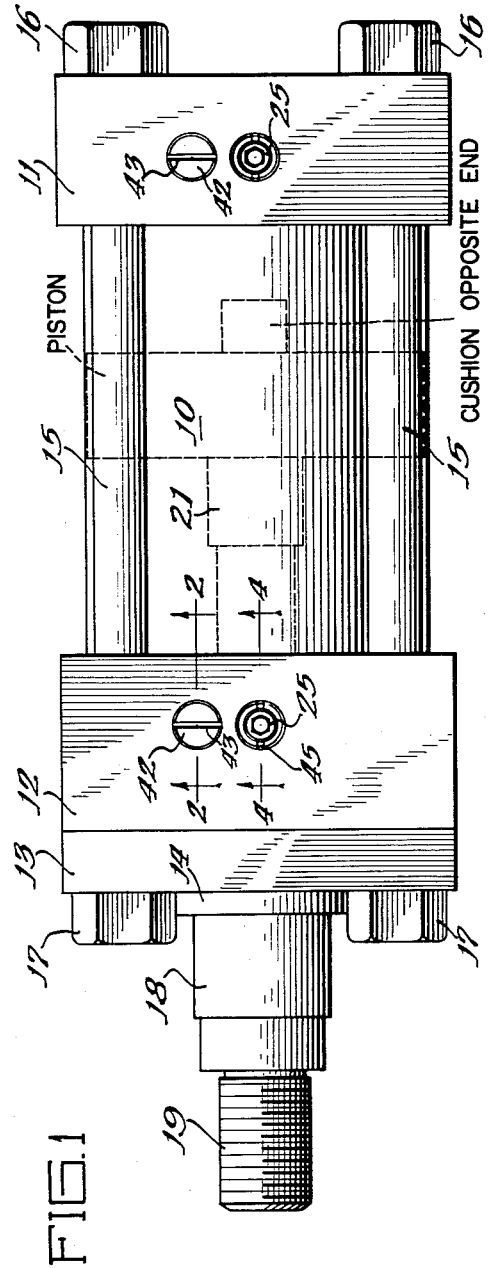
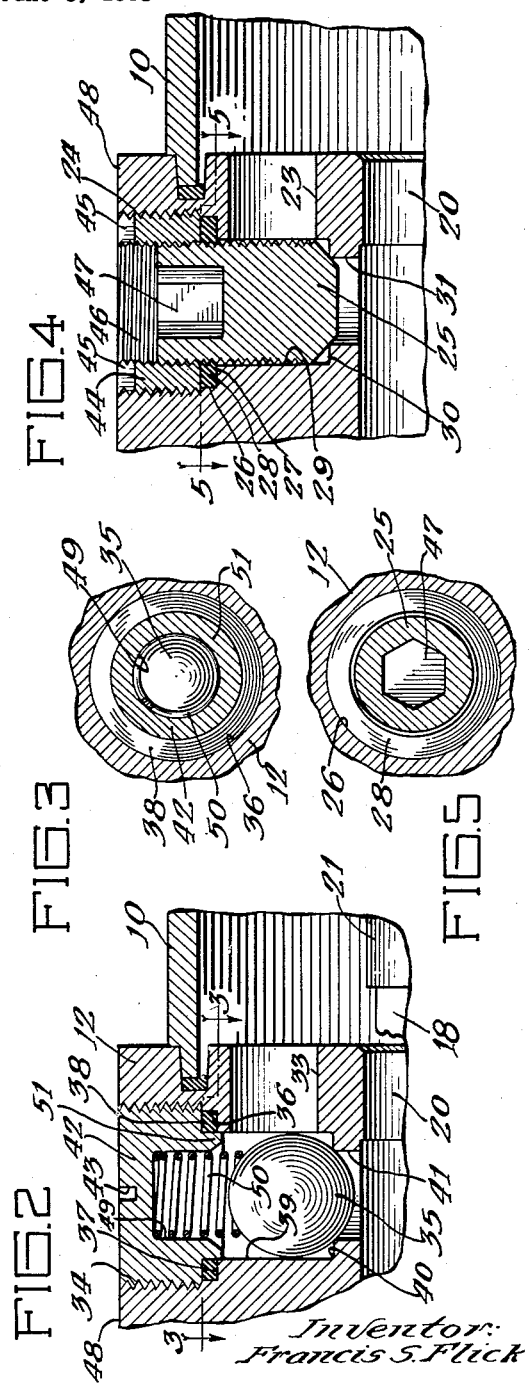
Inventor:
Francis S. Flick
By: Schroder, Hofgren,
Brady & Wegner
Attorneys

United States Patent Office 2,989,949
Patented June 27, 1961

2,989,949
PISTON SPEED CONTROL VALVES FOR PISTON AND CYLINDER DEVICES
Francis S. Flick, Oak Park, Ill., assignor to Flick-Reedy Corporation, a corporation of Illinois
Filed June 3, 1958, Ser. No. 739,510
9 Claims. (Cl. 121—38)

This invention relates to a structure employed to cushion a piston at the end of its stroke in a cylinder. More specifically, the invention relates to the means by which the speed of a piston at the end of its stroke is adjusted and controlled.

This application is a continuation-in-part of my co-pending application Serial No. 553,520, filed December 16, 1955, now abandoned.

Piston and cylinder devices are used both in pneumatic and hydraulic applications in which it is desired that the travel of the piston within the cylinder be cushioned against striking the heads of the cylinder with impact. In some installations, the rate of decreasing speed as the piston approaches the head of the cylinder is desirably controlled to a certain deceleration. This has generally been accomplished by restricting or closing the passage by which fluid is pushed out of the cylinder ahead of the piston. Most double-acting piston and cylinder devices are supplied with pressure fluid on one side so that the piston can push the fluid on the opposite side out through the port or passage through which the fluid entered. As the piston approaches the head, the exit passage can be substantially blocked, trapping fluid between the piston and head. When the force exerted by this fluid equals the force exerted by the fluid on the opposite side of the piston, the piston will, of course, stop.

In order to allow a piston to travel the full length of its confining cylinder, no fluid may be permanently trapped between the piston and the cylinder head. The body of fluid would, of course, prevent the piston from reaching a position against the head, particularly if the fluid was non-compressible. As a result of the desire to use the entire length of the cylinder, particularly in high speed applications, it has been a practice to provide a bypass around the blocked main passage in order to bleed the trapped fluid out to the port slowly enough to allow the piston to travel its full stroke but with the latter part of the stroke at a reduced speed.

Once the piston has travelled to the end of its stroke and it is desired to run the piston in the opposite direction, the fluid flow direction is merely reversed to introduce fluid under pressure to the end of the cylinder against which the piston rests. Most cushions involve the entry of a sleeve into the central port, the sleeve being carried by the piston structure. Upon the reversal of the fluid flow, only the area of the sleeve and its support would be subjected to the incoming fluid pressure. It is desirable that the entire piston area be subjected to this pressure in order to gain the benefit of the full power output of the device and faster start of the piston. In order to accomplish this, a second bypass passage around the blocked central passage is provided with a check valve therein for quickly admitting fluid into the cylinder. This has the effect of making the entire area of the piston available to receive the pressure of the entering fluid.

The effect of providing bypass passages around the main flow passage, one equipped with a needle valve structure and the other with a check valve structure, is to permit the control of the speed of movement of the piston, both going toward the end of the cylinder and leaving the same area. In the past, these structures have been made so that the speed of piston travel could be adjusted. The difficulty has been that none of the adjustments have been sufficiently accurate or capable of maintaining the selected adjustment over a long service life. Additionally, the structures have generally restricted the places in which the piston and cylinder device could be mounted because of their protrusions from the mounting surfaces of the device. The improvements of the present invention have eliminated these difficulties as will more clearly appear.

The primary object of this invention is to provide new and improved valve means for controlling piston travel speed at the ends of stroke in a cylinder.

Another object is to provide valve means of adjustable needle type and check type which may be interchangeably mounted and used in substantially identical housings provided therefor in the head of a cylinder.

Another object is to provide valve means as above identified which may be mounted flush with the outer part of a cylinder head so as not to interfere with the mounting of the cylinder.

Another object is to provide valve means as identified having a novel and improved sealing structure permitting adjustments of very fine amounts to be made and which does not require loosening of a lock nut and packing gland before adjustment nor tightening of a lock nut on a packing or sealing gland after an adjustment is made.

Another object is to provide novel valve structures as identified of a relatively short length requiring a minimum of mounting space and eliminating a great amount of multiplicity for piston and cylinder devices of different sizes.

Another object is to provide a valve means as described in which the adjustment is not disturbed once made because of the absence of any locking or sealing requirement following the adjustment.

A further object is to provide a novel stop tube feature for the check valve structure which prevents the extrusions of the ball check spring into the cylinder.

Other objects, features and advantages of the invention will become apparent from the following description of a preferred embodiment of the invention illustrated in the accompanying drawings, in which:

FIGURE 1 is a side elevational view of a piston and cylinder device embodying the novel valve means of the present invention, FIGURE 2 is a fragmentarily enlarged sectional view through the ball check valve means of the invention taken substantially along line 2—2 in FIGURE 1, FIGURE 3 is a horizontal sectional view through the valve means of FIGURE 2 taken substantially along line 3—3 therein, FIGURE 4 is a view similar to FIGURE 2 through the needle valve means embodying the invention and taken substantially along line 4—4 in FIGURE 1, and FIGURE 5 is a horizontal sectional view through the valve means shown in FIGURE 4 taken substantially along line 5—5 therein.

The piston and cylinder device in which the present invention is incorporated for purposes of illustration, is shown in FIGURE 1 of the drawings as a high pressure hydraulically operated fluid motor. It has a cylindrical tube 10 closed at one end by a square cap 11 and at the other end by a square head 12 and retaining plate 13 for holding rod bushing 14 in place. The head and cap are held in proper relation to the cylinder 10 by four tie rods 15 having nuts 16 and 17 at opposite ends, the tie rods being in the corners of the square head and cap. A piston rod 18 extends through the rod bushing 14 and is connected internally of the cylinder with a piston of known design. The outer end of the rod may be threaded as at 19 for the purpose of receiving connection to a device intended to be operated.

As the piston reciprocates within the cylinder toward the cap and toward the head, its movement should be slowed as it approaches either extremity of the cylinder. This is particularly desirable where the motive fluid is extremely high pressure or the speed of travel of the piston is quite rapid. Motive fluid passes into the interior of the cylinder, through a central passage formed in the head and cap partially illustrated as at 20 in FIGURES 2 and 4. A port (not shown) extends out through a side of the head and cap connecting with the central passage. Since the motive fluid is forced into the cylinder in order to move the piston, and opposite direction of piston movement is accomplished by changing the direction of fluid flow, the piston is utilized to push fluid ahead of it out of the port toward which it is moving. As shown partially in FIGURE 2, the piston rod 18 may have a sleeve 21 held against a shoulder in the rod, the sleeve being of a size to enter the port 20 susbtantially blocking or closing the same. When the sleeve thus substantially closes the central passage, a space is left between the piston and the head 12 in which fluid is trapped. Pressure on the trapped fluid will rise quite rapidly as the piston continues to move toward the head. The piston will be slowed in its speed of travel as the pressure of the trapped fluid increases, and would stop when the force exerted reaches that of the motive fluid on the other side of the piston were it not for the structure permitting the bleeding out of the trapped fluid into the exit port. The bleeding is accomplished by means of a bypass passage such as 23, illustrated in FIGURE 4, past a needle valve member 25. Such a valve member 25 is provided, one in the cap and one in the head at opposite ends of the cylinder so as to allow the piston to travel its full stroke even though provided with cushioning means.

Once the piston has moved to a position against the head, its direction of movement away from the head is accomplished by pumping in fluid through the same port previously serving as an exit for the fluid. In order that the entire area be subjected to the incoming pressure, an additional bypass passage, such as 33 shown in FIGURE 2, is provided with a ball type check valve member 35 arranged to open and allow the incoming fluid to pass quickly into the cylinder. Thus, not only the area of the piston structure blocking the central passage, but the entire area of the piston is subjected to the incoming fluid pressure immediately.

The present invention has to do primarily with the improved structure of the valving by which the desired control of the piston travel speed is accomplished. Both the needle valve structure 25 and the ball check structure 35 are mounted in housings formed within the heads of the cylinder in precisely the same way. Each bypass passage has a branch such as 23 and 33 joining the interior of the cylinder to a bore extending from the passage 20 to the exterior of the head. The latter bore is of stepped design. Referring to FIGURE 2, the outer and largest diameter part of the bore is equipped with a relatively fine thread 34 and extends inwardly to a cylindrical surface 36 forming the outer wall adjacent a radially aligned shoulder 37 adapted to receive a sealing ring 38. The next smaller bore 39 is smooth and extends past the lateral passage 33 to an inner shoulder 40. The inner periphery of this shoulder is next adjacent the smallest cylindrical part 41 of the bore, forming at its periphery a seat for the ball 35.

The bore for the needle valve is formed with the same drilling pattern, in fact, identical to the drilling pattern for the check valve. The fine outer thread 24 is of the same tap as the thread 34. A 32 thread per inch fine thread has been found very satisfactory. The thread extends downwardly to the cylindrical surface 26 adjacent the shoulder 27 receiving the sealing ring 28. A cylindrical portion 29 extends inwardly from the shoulder 27 to an inner shoulder 30 adjacent a smaller bore 31 extending to the passage 20. Here, likewise, the shoulder 30 and the smallest bore 31 together form a peripheral edge in the nature of a valve seat for the needle valve 25.

The operation of the sealing structure employed in the valve means is such that the valve may be interchangeably placed in either of the bores. In the case of the ball check shown in FIGURE 2, a housing 42 provided with a central key slot 43 may be threaded into the outer portion of the valve housing so as to tighten down upon the sealing ring 38. A static seal preventing the leakage of any high pressure fluid to the mating threads is thus formed. In the case of the needle valve, the sealing ring 28 is provided on its inner surface with a thread adapted to mate with the thread of the needle valve. A separate ring shaped support 44, provided with diametrically aligned slots 45, is threaded into the outer portion of the valve housing and provided on its inner diameter with a fine thread 46 to receive the threaded needle valve member 25. The needle valve is provided with a socket 47 by which it may be turned within the supporting ring. The fine thread used will permit an adjustment of about .008" of longitudinal movement with a one quarter turn of the valve member.

A very important feature of the needle valve is the structure permitting adjustment thereof without disturbing either the sealing function or the structure which locks the valve in position once an adjustment is made. The sealing ring 28 is preferably formed of Teflon, a plastic material made by Du Pont and more properly called tetrafluoroethylene. The ring member 44 is pressed downwardly against the sealing ring so that the threads on the latter completely fill and press inwardly against the threads and the valve member 25. Sufficient manual force may be applied to the valve member to turn it without disturbing the sealing or locking functions of the sealing ring against the threads of the valve. Thus, an adjustment may be made by turning the needle valve only, requiring no other operation before or after, or during the adjustment.

It should also be noted that both the check valve and needle valve may be mounted so as to be flush with the outer surface 48 of the heads. Thus, there can be no damage to the valves and the valves do not interfere with any mounting of the piston and cylinder device.

The ball check valve structure, illustrated in FIGURE 2, is of special design to prevent damage that has been experienced in the past. It should be noted that the housing 42 is provided with an inner cylindrical part 49 for the purpose of receiving a compression spring 50. The inner end 51 of the housing is chamfered so that the ball 35 may seat thereagainst when forced upwardly off the shoulder 40 forming the normal seat for the ball. In this position, that is, open, the spring 50 will not be completely compressed. The coils of the spring will not be against each other. In the past, ball checks have created difficulty in that when open, they bottomed against the spring tending to force the spring over the ball and gradually permit the spring to extrude into the cylinder device. Ordinarily, sufficient opening may be provided by movement of the ball a distance about equal to one half its diameter and when this movement has occurred, the ball will seat against the stop tube formed by the inner end 51 of the housing.

The valve parts are preferably formed of stainless steel and the sealing rings are preferably made of Teflon, so that any particular installation may be suitable for both high and low temperature applications as well as the handling of corrosive fluids. The needle valve and ball check may be interchangeably placed in the housings prepared to receive them so that considerable latitude is permitted in the location of the needle valve which may, from time to time, require adjustment.

The operation of adjusting the needle valve member 25 is made quite easy by its particular structure. The outer surface of the valve member 25 is so proportioned relative to the fluid flow passages 23 and 31 and to the supporting ring 44 that a visual indication or gauge as to the position of the valve is provided. It will be understood that the valve is provided in various sizes depending upon the size of the particular cylinder in which it is placed. The drawings are not particularly to scale, but are meant to illustrate clearly the particular structure involved. In actual practice, the bypass passage is fully open when the outer surface of the valve member 25 is flush with the bottom of the grooves 45 in the supporting ring. This gives a visual indication of when the valve is open and no guess work is required. The valve will, of course, stop against its seat when turned to closed position.

The foregoing detailed description has been given for clearness of understanding only and no unnecessary limitations are to be understood therefrom, for some modifications will be obvious to those skilled in the art.

I claim:

1. In a piston and cylinder device, valve means for controlling piston speed at the ends of the cylinder, comprising: a head at each end of the cylinder having a central fluid flow passage; means for substantially closing a portion of said central passage as the piston approaches the head having same, each head having a pair of substantially identically sized auxiliary fluid passages connecting the cylinder interior with the central passage around said closed portion of the central flow passage, each auxiliary passage in each of said heads having a stepped bore extending to the exterior of the head and providing spaced inner and outer shoulders facing outwardly, the inner shoulder being adjacent said lateral port and forming a valve seat and the outer shoulder being adjacent the exterior of the head with only the bore beyond said outer shoulder to the head exterior being threaded; a sealing ring sealed on said outer shoulder; each of said auxiliary passages having a portion joining the interior of the cylinder to the stepped bore intermediate said shoulders; a spring pressed ball check valve member in one of said stepped bores in each of said heads urged toward seating on the seat therein; and a needle valve member in the other of said stepped bores in each of said heads for seating on the seat therein, each of said valve members having a mounting portion threaded into the outer portion of said respective stepped bore and sealed by said sealing ring against leakage, said valve members being adapted to control fluid flow into and out of the cylinder when the central passage is substantially closed at the end of the piston travel.

2. Valve means in a piston and cylinder device as specified in claim 1 wherein said pair of auxiliary passages are substantially identical in shape and size and each valve member mounting portion is positioned in said threaded portion below the outer surface of the cylinder head.

3. Valve means in a piston and cylinder device as specified in claim 1 wherein the mounting portion for the needle valve member is a ring with external and internal threads and the needle valve member is threadably supported solely in the ring, said ring forcing the sealing ring against its shoulder and inwardly against the needle valve member for sealing and locking the needle valve member in adjusted positions.

4. Valve means in a piston and cylinder device as specified in claim 3 wherein the sealing ring is provided with a threaded internal surface mating with threads on the needle valve, said threads on the sealing ring entering and filling the threads mating therewith for both sealing and locking the needle valve in adjusted positions and maintaining said sealing during movement of said needle valve between adjusted positions.

5. Valve means in a piston and cylinder device as specified in claim 1 wherein the mounting portion for said spring pressed ball has an outer threaded periphery threaded into the outer portion of the stepped bore and an inner sleeve portion housing a coiled compression spring bearing against the mounting portion and ball, said sleeve portion being in position to engage and stop the ball when lifted off its valve seat.

6. An adjustable valve for a cushion relief passage in the head of a piston and cylinder device, comprising: an internally and externally threaded valve supporting ring mounted in a stepped bore intersecting the relief passage; a ring of sealing material abutting one step in the bore and the base of the supporting ring and having an inner portion extendable into sealing engagement with the internal threads of the supporting ring; and an externally threaded valve member carried solely by said supporting ring below the outer surface of said head for selective adjustable blocking of said relief passage, said supporting ring compressing said sealing material into contact with the bore and the valve member to seal against leakage from the relief passage and to lock the valve member against accidental movement from its adjusted blocking of the relief passage, said valve member having exposed means for manual adjustment thereof without disturbing said supporting ring and sealing ring.

7. Valve means for a piston and cylinder device as specified in claim 6 wherein the sealing ring is provided with a threaded inner surface mating with the threaded outer surface of the valve member, said sealing ring threads filling and sealing the threads mated therewith to maintain said sealing during movement of the valve member.

8. In a piston and cylinder device, valve means for controlling piston speed at the ends of the cylinder, comprising: a head at each end of the cylinder having a central fluid flow passage for ingress and egress of motive fluid; means for substantially closing said central passage as the piston approaches near to the respective head, each head having a pair of substantially identically sized bypass fluid passages extending around the closed portion of said central passage with a stepped bore portion extending to the exterior of the head, an inner and an outer shoulder in said stepped bore with a portion of the bypass passage opening into the bore intermediate the bores, the inner shoulder facing outwardly and extending radially between portions of the stepped bore to form a valve seat, the outer shoulder also facing outwardly and forming a ledge for receiving a sealing ring, a sealing ring seated on said ledge, the outermost section of said stepped bore being threaded from the exterior of the head inwardly to said ledge; a needle valve member supported in one of said bypass passages and a ball check valve member supported in the other of said bypass passages, both said valve members being supported by said threaded outer portion of said stepped bore so as to extend below the outer surface of said head and to cooperate with said valve seat within the bypass passage.

9. In a piston and cylinder device, valve means for controlling piston speed at the end of piston stroke, comprising: a head on the cylinder; means forming a main fluid flow passage to and from the cylinder through the head; means for substantially closing said main passage as the piston approaches an end of its stroke; means forming a pair of separate bypass passages in said head around said main passage, each bypass passage having walls forming a substantially identically sized valve housing including an inner seat, an outer seat and an outer threaded bore beyond said outer seat for supporting a valve member; a ball check valve member and a needle valve member each having a supporting member threaded to mount interchangeably in either of said threaded outer bores, both supporting members being formed to support its respective valve member entirely within the valve housing to avoid protrusion outwardly of said cylinder head.

References Cited in the file of this patent

UNITED STATES PATENTS

| | | |
|---|---|---|
| 2,308,788 | Somes | Jan. 19, 1943 |
| 2,382,457 | Wertman | Aug. 14, 1945 |
| 2,636,233 | Perkon | Apr. 28, 1953 |
| 2,782,765 | Robinson | Feb. 26, 1957 |

OTHER REFERENCES

Miller Fluid Power Co. Bulletin A–105k, copyright 1954.